United States Patent Office 2,703,177
Patented Mar. 1, 1955

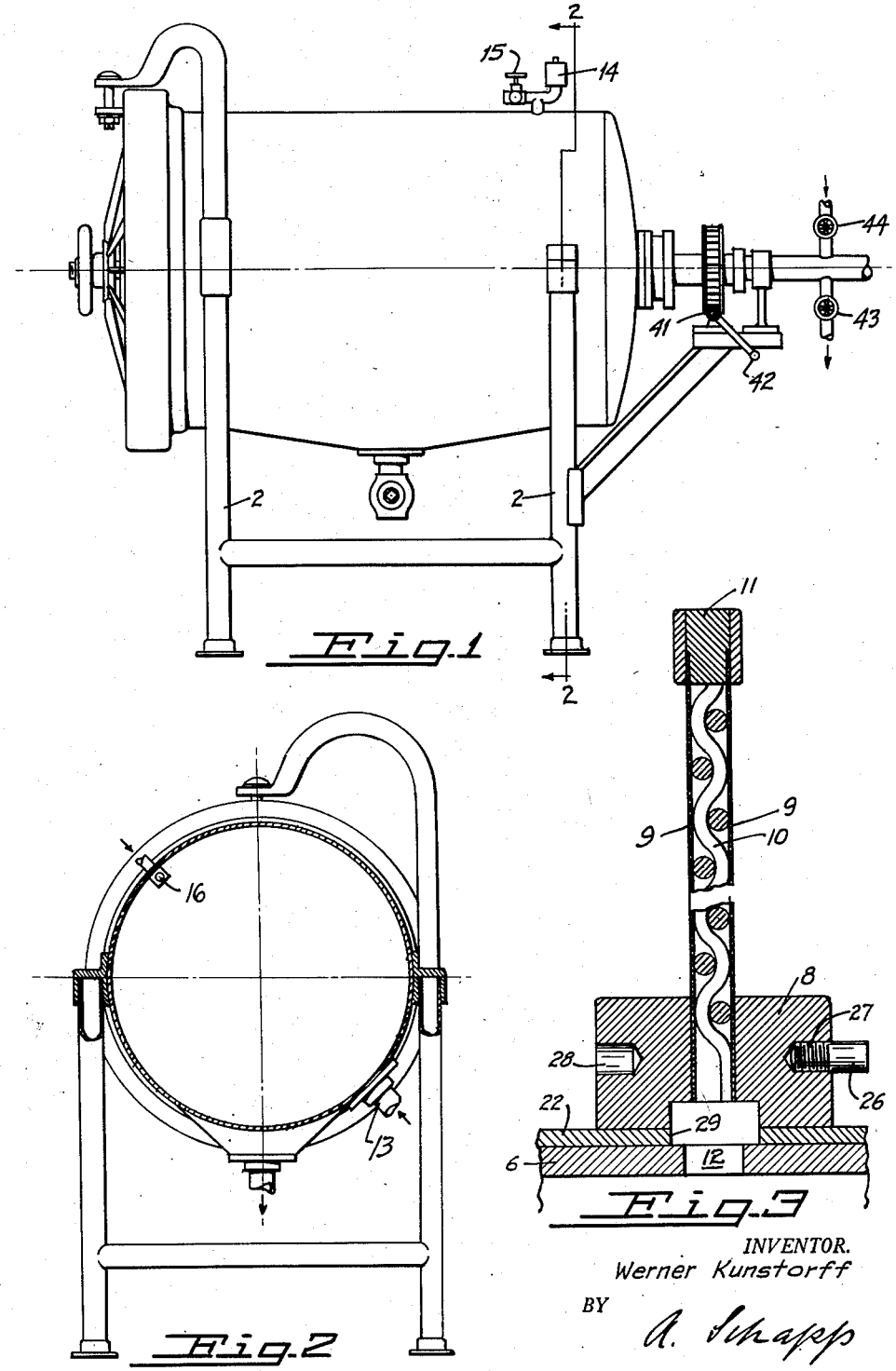

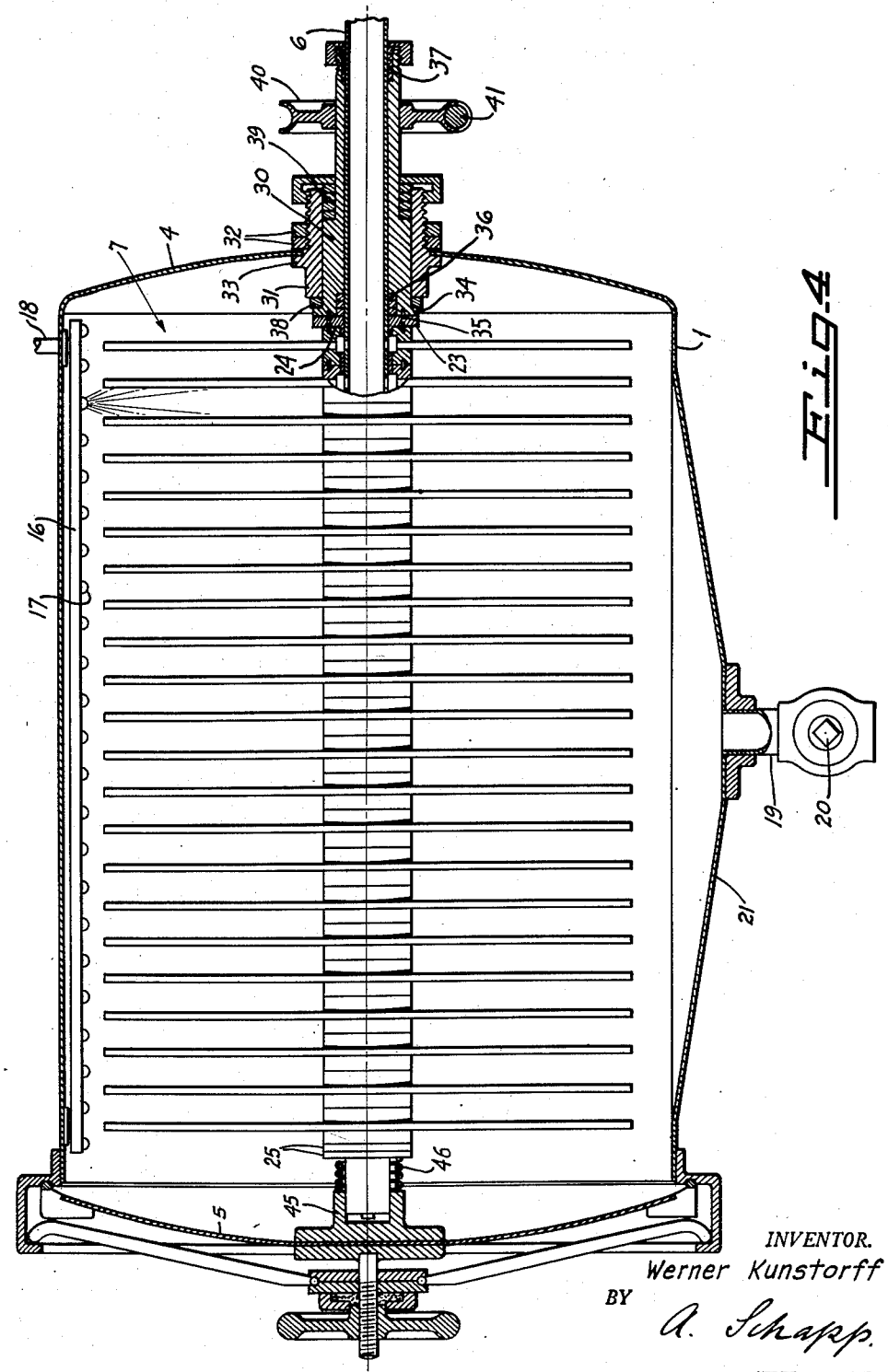

2,703,177

FILTER

Werner Kunstorff, San Francisco, Calif.

Application December 4, 1950, Serial No. 198,964

2 Claims. (Cl. 210—200)

The present invention relates to filters and has particular reference to filters in which an assembly of filter discs is mounted upon a hollow shaft and in which the liquid to be filtered is forced through the filter discs into the hollow shaft for endwise discharge from the latter. In filters of this type a filtering medium, such as diatomaceous earth, is conventionally injected into the liquid before it is passed through the filter discs, the diatomaceous earth being made to settle upon the faces of the discs and to absorb impurities from the liquid to be filtered.

As the layer of diatomaceous earth on each filter disc increases in thickness, the efficiency of the filter gradually decreases, and it becomes necessary from time to time to clean the filter, which in filters now in use is a laborious effort, usually calling for the disassembling of the filter disc assembly and for a complete shut-down of the apparatus for extended time periods.

During the filtering process in machines of this type obnoxious and injurious gases frequently develop in the filter, and again, in the cleaning process solvents and steam may have to be used which often result in injury to the workmen where the cleaning process has to be carried on outside the filter housing.

In the present invention it is proposed to provide a structural arrangement which allows the cleaning process to be carried out entirely within the housing, without the necessity of taking the filter assembly out of the housing, and without the escape of injurious gases, and in which the cleaning may be effected in a very short time period and without any manual labor.

For this purpose it is proposed to utilize a spraying arrangement whereby a spray of water, steam or solvent, as the case may be, is directed at the sides of the screening discs to wash off the diatomaceous earth and impurities held thereon, the cleaning medium with the entrained solids being discharged through the bottom of the housing directly into the sewer or other point of disposal.

It is further proposed to arrange the spraying means in such a manner as to discharge from a designated point or line outside the disc assembly so as to directly affect a limited portion of the surface area to be cleaned only, and to mount the disc assembly with freedom of revolving motion whereby different sections of the disc assembly may be passed through the spray successively to effect a thorough cleaning of the entire disc assembly.

It is further proposed to provide means operable from the outside of the filter housing for effecting revolving movement of the disc assembly.

And finally, it is proposed to provide means for mounting the disc assembly on a central shaft as a unitary, revolvable structure adapted for withdrawal from the housing as a unit, with means for interlocking the individual discs against turning movement with respect to one another, whereby removal of the disc assembly is greatly facilitated, in case such removal becomes necessary for repair purposes.

Further objects and advantages of my invention will appear as the specification proceeds, and the novel features of my invention will be fully defined in the claims attached hereto.

The preferred form of my invention is illustrated in the accompanying drawing, in which:

Figure 1 shows a side view of my filter,
Figure 2, a section taken along line 2—2 of Figure 1,
Figure 3, a fragmentary sectional view through an individual filter disc, and
Figure 4, a longitudinal section through my filter.

While I have shown only the preferred form of my invention, I wish to have it understood that various changes and modifications may be made within the scope of the claims attached hereto without departing from the spirit of the invention.

Referring to the drawing in detail, my filter may be, in its general characteristics, of conventional form, comprising a cylindrical housing 1 mounted, with its axis disposed horizontally, on suitable standards 2, and having a closed rear end 4 and a removable cover 5 closing its front end. A fixed hollow shaft 6 extends centrally through the housing and the filter disc assembly 7 is mounted on the shaft, each disc comprising a hub 8, a pair of spaced perforated plates 9 projecting from the hub, a wire screen 10 mounted between the plates, and a rim 11 holding the plates and the screen in assembled relation at their peripheries. The discs communicate with the inside of the hollow shaft through ports 12. The liquid to be cleaned, after having received its admixture of diatomaceous earth, is forced into the housing under pressure through the valved inlet 13. A safety valve may be provided as at 14 and a manually operated vent valve as at 15.

In the conventional operation of the filter the liquid with the entrained diatomaceous earth is forced into the housing under pressure and is made to pass through the filter discs into the hollow shaft for discharge through the projecting end of the latter. During this process diatomaceous earth settles on the filter discs and becomes the filtering medium for collecting impurities contained in the liquid. During the initial stage, that is before a layer of diatomaceous earth has built up on the discs, there is little filtering action, and the first liquid passing through the filter is returned into the circuit for further filtering. After the layer of diatomaceous earth on the discs has built up to a certain thickness, the filter becomes inoperative and it becomes necessary to clean the discs before operation can be resumed.

My invention is directed principally to means for facilitating the cleaning of the filter discs.

For this purpose I provide a spray in the form of a pipe 16 mounted longitudinally along the wall of the housing and outside the disc assembly, this pipe being provided with spray nozzles 17, one for each space between any two filter discs, the pipe having an inlet for the cleaning medium, which may be water, steam or solvent, as the occasion may require, as at 18. The pipe is shown in Figure 4 as being mounted vertically above the central shaft, but should preferably be mounted at a point 45 degrees below said position, as shown in Figure 2. The nozzles are made to spread the spray issuing therefrom so as to strike the opposing walls of the discs and to wash off the sediment adhering thereto for discharge through a bottom port 19 in the housing controlled by a valve 20. To insure complete emptying of the housing, I make the bottom portion in the form of a dished pan 21, with the port disposed in the lowest point of the pan.

The cleaning action of the spray issuing from a single pipe is necessarily confined to a limited area and in order to insure a thorough cleaning of the entire disc area I provide means for revolvably mounting the entire disc assembly whereby successive portions of the discs may be subjected to the cleaning action.

For this purpose I mount all of the discs on a bushing 22 which is substantially coextensive with the length of the hollow shaft inside the drum and which is revolvable on the shaft. The rear end of the bushing has an outwardly projecting flange 23, and the hubs 8 of the discs are slidable on this bushing, with the first hub bearing against the flange as at 24 and the other hubs being arranged on the bushing in successive order so as to contact each other. The last hub may be held on the bushing by means of lock nuts 25 or in any other suitable manner designed to urge the entire disc assembly upon the flange 23. In order to prevent the discs or disc hubs from turning with respect to each other and with respect to the bushing, I provide a series of dowel pins 26 interlocking the first hub with the flange 23 and each succeeding hub with the preceding one. These dowel pins are preferably arranged in pairs on opposite sides of the center line, each dowel pin being threaded into one of the adjacent members, as at 27, and slidable in a socket in the other member as at 28. The position of the thread is reversed on opposite sides of the centerline so that each re-assembling operation positively brings all the hubs and discs into the exact relative position previously occupied. The bushing is formed with ports 29 adapted to be brought into registry with the ports 12 in the hollow shaft 6.

To impart rotary motion to the bushing 22 and the disc assembly, I use a rotor 30 revolvable on the shaft 6 and also revolvable in a bearing 31 secured in the rear end 4 of the housing in any suitable manner, as by a pair of nuts 32 cooperating with a flange 33 projecting from the bearing.

The rotor 30 is in the form of a sleeve extending inwardly of the housing and also outwardly of the same and having, at its inner end, a flange 34 adapted to register with the flange 23 of the bushing 22, the two flanges being interlocked by means of dowel pins 35 in the manner previously described. Escape of liquid and gas past the rotor is prevented by suitable means, as by washers 36 and 37 on the shaft 6 and washers 38 and 39 between the rotor and the bearing 31.

The outer end of the rotor carries a worm gear 40 meshing with a worm 41 which latter may be operated by a hand crank 42 or any suitable power drive.

The outer end of the shaft is provided with a suitable outlet valve 43 and an inlet valve 44 for the admission of a cleaning liquid. The inner end of the shaft 6 is supported in a bearing 45 secured upon the cover 5, and a heavy spring 46 serves to urge the bushing 22 and the entire disc assembly upon the flange 34 of the rotor.

In operation, if it becomes necessary to clean the filter disc assembly, the operator first closes the liquid inlet valve 13 and the liquid outlet valve 43. Next he opens the valve 20 and admits a cleaning medium such as water, steam or solvent, through the pipe 18 causing a spray through the nozzles 17 to impinge upon both sides of each disc to wash off the sediment adhering to the discs, the cleaning medium escaping through the bottom valve 20. At the same time he operates the crank handle 42 for rotating the rotor 30 and the entire disc assembly which causes successive sections of the discs to pass through the spray for effecting a thorough cleaning of the entire disc area.

After the sediment adhering to the discs has been removed, as may be observed by the appearance of the liquid passing through the outlet port 19, the operator turns off the spray and allows the disc assembly to come to rest in a position where the ports 29 in the bushing register with the ports 12 in the hollow shaft, which may be established by any suitable markings.

If further cleaning is desired, from inside out, to wash the screens inside the discs and to clear the perforations in the disc plates, the operator opens the inlet valve 44 to admit a cleaning medium into the hollow shaft to pass through the ports 12 and 29 into the discs and to wash out the screens and the plates of the disc, for final discharge through the port 19. This causes the cleaning medium to pass through the disc assembly in a direction reverse to that of liquid to be filtered in normal operation and removes the last vestige of sediment.

If it is desired to take the apparatus apart for repair or other purposes, the entire disc assembly may be removed as a unit upon removal of the cover 5, the bushing 22 separating from the rotor 30 at the dowel pins 35, one of which adheres to the bushing while the other one adheres to the rotor.

Suitable transparent windows may be provided where desired for observation of the liquid in accordance with conventional practice.

I claim:

1. In a filter of the character described, a cylindrical housing having a closed end and an open end with a removable cover for the latter end, means for horizontally mounting the cylinder, a hollow shaft fixedly mounted outside the closed end of the housing and extending axially through the closed end into the housing and stopping short of the cover, the latter having means for supporting the free end of the shaft, a bushing revolvable on the shaft within the housing and slidable on the shaft in the direction of the open end of the housing and having a flange facing the closed end of the housing, a plurality of filter discs and spacing members mounted on the bushing in alternate succession, positioning means interlocking the spacing members to prevent relative rotation between the same, a nut threaded on the end of the bushing opposite the flange to cooperate with the latter for compacting the filter discs and the spacing members into a rigid unit, a rotor revolvable in the closed end of the housing and on the shaft projecting therethrough and having a flange facing the flange of the bushing, means for interlocking the two flanges, and means on the outside of the housing for revolving the rotor.

2. In a filter of the character described, a cylindrical housing having a closed end and an open end with a removable cover for the latter end, means for horizontally mounting the cylinder, a hollow shaft fixedly mounted outside the closed end of the housing and extending axially through the closed end into the housing and stopping short of the cover, the latter having means for supporting the free end of the shaft, a bushing revolvable on the shaft within the housing and slidable on the shaft in the direction of the open end of the housing and having a flange facing the closed end of the housing, a plurality of filter discs and spacing members mounted on the bushing in alternate succession, positioning means interlocking the spacing members to prevent relative rotation between the same, a nut threaded on the end of the bushing opposite the flange to cooperate with the latter for compacting the filter discs and the spacing members into a rigid unit, a rotary revolvable in the closed end of the housing and on the shaft projecting therethrough and having a flange facing the flange of the bushing, means responsive to a sliding movement of the bushing on the shaft for interlocking the two flanges, spring means braced against the cover of the housing for urging the bushing toward the rotor, and means on the outside of the housing for revolving the rotor.

References Cited in the file of this patent

UNITED STATES PATENTS

| | | |
|---|---|---|
| 607,929 | Hinken | July 26, 1898 |
| 1,227,983 | Vallez | May 29, 1917 |
| 1,438,797 | Vachier | Dec. 12, 1922 |
| 1,510,568 | Sweetland | Oct. 7, 1924 |
| 1,666,515 | Sweetland | Apr. 17, 1928 |
| 1,670,319 | Sweetland | May 22, 1928 |
| 2,045,740 | Wilson et al. | June 30, 1936 |
| 2,207,618 | Grill et al. | July 9, 1940 |
| 2,221,141 | Kindt | Nov. 12, 1940 |
| 2,593,707 | Walker | Apr. 22, 1952 |

FOREIGN PATENTS

| | | |
|---|---|---|
| 580,230 | France | 1924 |
| 647,095 | France | 1928 |